(12) United States Patent
Riener et al.

(10) Patent No.: US 7,660,071 B1
(45) Date of Patent: Feb. 9, 2010

(54) DISK DRIVE WITH ALTITUDE DETECTION AIR VANE

(75) Inventors: Timothy A. Riener, Fremont, CA (US); Francis P. Crimi, Los Altos, CA (US)

(73) Assignee: Seagate Technology, LLC, Scotts Valley, CA (US)

( * ) Notice: Subject to any disclaimer, the term of this patent is extended or adjusted under 35 U.S.C. 154(b) by 326 days.

(21) Appl. No.: 11/222,553

(22) Filed: Sep. 9, 2005

Related U.S. Application Data (60) Provisional application No. 60/658,903, filed on Mar. 4, 2005.

(51) Int. Cl.
*G11B 33/10* (2006.01)
*G11B 25/04* (2006.01)

(52) U.S. Cl. .................................. 360/97.01; 360/234
(58) Field of Classification Search .............. 360/97.01, 360/97.02, 234, 256.1
See application file for complete search history.

(56) References Cited

U.S. PATENT DOCUMENTS

| | | | |
|---|---|---|---|
| 3,753,254 A * | 8/1973 | Ruble et al. .............. 360/77.02 |
| 4,538,193 A | 8/1985 | Dimmick et al. |
| 4,587,645 A * | 5/1986 | Wong et al. .............. 360/97.02 |
| 4,636,891 A * | 1/1987 | Barski ...................... 360/97.02 |
| 5,274,519 A * | 12/1993 | Saito et al. ................ 360/254.3 |
| 5,541,791 A * | 7/1996 | Yamasaki et al. ......... 360/256.1 |
| 5,602,700 A * | 2/1997 | Viskochil et al. ......... 360/256.1 |
| 5,717,544 A * | 2/1998 | Michael .................... 360/256.1 |
| 5,898,545 A * | 4/1999 | Schirle ..................... 360/254.7 |
| 5,999,371 A * | 12/1999 | Wood et al. .............. 360/256.1 |
| 6,337,782 B1 * | 1/2002 | Guerin et al. ............. 360/256.1 |
| 6,339,521 B1 * | 1/2002 | Durrum et al. ........... 360/256.1 |
| 6,342,991 B1 * | 1/2002 | Joshi et al. ............... 360/256.1 |
| 6,362,937 B1 * | 3/2002 | Gibbs et al. .............. 360/256.1 |
| 6,462,912 B1 * | 10/2002 | Pasupathy et al. ........ 360/256.1 |
| 6,639,886 B1 * | 10/2003 | Cook et al. ................. 720/649 |

* cited by examiner

*Primary Examiner*—Craig A. Renner
(74) *Attorney, Agent, or Firm*—McCarthy Law Group (57) ABSTRACT

A disk drive includes a rotatable data storage disk and a vane positioned adjacent to the disk that receives airflow generated during rotation of the disk. A sensor is operably coupled to the vane and measures airflow force on the vane. Because of a known relationship between altitude and airflow force, the amount of airflow force on the vane is indicative of altitude of the disk drive. The sensor provides an output signal that is indicative of measured airflow force on the vane. The vane surface may be oriented substantially orthogonal to a plane of the disk or substantially parallel with a plane of the disk.

20 Claims, 5 Drawing Sheets

DISK DRIVE WITH ALTITUDE DETECTION AIR VANE

RELATED APPLICATION

This application claims the benefit of and priority to U.S. Provisional Patent Application No. 60/658,903, filed Mar. 4, 2005, the disclosure of which is hereby incorporated herein by reference as if set forth in its entirety.

FIELD OF THE INVENTION

The present invention generally relates to digital data storage devices and, more particularly, to determining the altitude at which a digital data storage device is operating.

BACKGROUND OF THE INVENTION

Disk drives are digital data storage devices which can enable a host device to store and retrieve large amounts of data in a fast and efficient manner. A typical disk drive includes a plurality of magnetic recording disks which are mounted to a rotatable hub of a spindle motor and rotated at a high speed. An array of read/write transducers is disposed adjacent surfaces of the disks to transfer data between the disks and the host device. The transducers can be radially positioned over the disks by a rotary actuator and a servo system.

A plurality of nominally concentric tracks can be defined on each disk surface. As understood by those skilled in the art, a preamp and driver circuit generates write currents that are used by a transducer to selectively magnetize the tracks during a data write command and amplifies read signals detected by the transducer from the selective magnetization of the tracks during a data read command. A read/write channel and interface circuit are connected to the preamp and driver circuit to transfer the data between the disks and the host device.

Each transducer is connected to a structure referred to as a "slider." The slider is mounted on a spring-loaded flexible arm that causes the slider with the connected transducer to press against a disk surface when the disk is stationary. When the disk spins up to operating speed, the high rotational speed causes air to flow under the slider thereby generating a fluid or hydrodynamic bearing, commonly referred to as an "air bearing" by those skilled in the art. The purpose of the air bearing is to provide adequate and appropriate force on the transducer-bearing slider so that a known separation is maintained between the transducer and the disk. Thus, a transducer floats over the surface of a spinning disk without physically touching the disk. The space between a transducer and a spinning disk (i.e., the transducer-to-disk clearance) is referred to as the "head/disk clearance" or just "clearance." Clearance is an important parameter for operation of a disk drive. If clearance is too large, a transducer cannot properly read and write a disk. If clearance is too small, there is chance that the transducer will crash into the spinning disk and cause physical damage to either or both the transducer and disk (referred to as "disk crash").

The altitude at which a disk drive operates influences clearance. At high altitudes, the reduced air pressure renders the air bearing incapable of maintaining the proper clearance, which can cause disk crash. Unfortunately, conventional disk drives are not configured to detect operating altitude. Although numerous altitude detection technologies exist that utilize pressure transducers for barometric estimation of altitude, cost, measurement sensitivity, accuracy and packaging concerns have prevented incorporation into disk drives here-to-date. As such, a need exists for a way to detect operating altitudes of disk drives.

SUMMARY OF THE INVENTION

In view of the above discussion, a disk drive includes a rotatable data storage disk that generates airflow during rotation and a vane positioned adjacent to the rotatable disk so as to receive the generated airflow. Because of a known relationship between altitude and airflow force on the vane, the amount of force on the vane as a result of airflow is indicative of altitude of the disk drive. A sensor is operably coupled to the vane and measures force on the vane caused by the airflow. The sensor provides an output signal that is indicative of the measured airflow force. The disk drive controller determines disk drive altitude based on the output signal and a known relationship between measured airflow force on the vane and disk drive altitude.

According to embodiments of the present invention, the vane surface is oriented substantially orthogonal to a plane of the disk. Thus, the vane is impinged by the generated airflow. According to other embodiments of the present invention, the vane surface is oriented substantially parallel with a plane of the disk. Thus, airflow over the vane surface creates a Bernoulli effect that causes the airflow between the disk and the vane to impart a lift force on the vane.

DETAILED DESCRIPTION OF THE INVENTION

The present invention now is described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

Like numbers refer to like elements throughout. In the figures, the thickness of certain lines, layers, components, elements or features may be exaggerated for clarity. Broken lines illustrate optional features or operations unless specified otherwise. All publications, patent applications, patents, and other references mentioned herein are incorporated herein by reference in their entireties.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. As used herein, phrases such as "between X and Y" and "between about X and Y" should be interpreted to include X and Y. As used herein, phrases such as "between about X and Y" mean "between about X and about Y." As used herein, phrases such as "from about X to Y" mean "from about X to about Y."

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the specification and relevant art and should not be interpreted in an idealized or overly formal sense unless expressly so defined herein. Well-known functions or constructions may not be described in detail for brevity and/or clarity.

It will be understood that when an element is referred to as being "on", "attached" to, "connected" to, "coupled" with, "contacting", etc., another element, it can be directly on, attached to, connected to, coupled with or contacting the other element or intervening elements may also be present. In contrast, when an element is referred to as being, for example, "directly on", "directly attached" to, "directly connected" to, "directly coupled" with or "directly contacting" another element, there are no intervening elements present. It will also be appreciated by those of skill in the art that references to a structure or feature that is disposed "adjacent" another feature may have portions that overlap or underlie the adjacent feature.

Spatially relative terms, such as "under", "below", "lower", "over", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is inverted, elements described as "under" or "beneath" other elements or features would then be oriented "over" the other elements or features. Thus, the exemplary term "under" can encompass both an orientation of "over" and "under". The device may be otherwise oriented (rotated 90 degrees or at other orientations) and the spatially relative descriptors used herein interpreted accordingly. Similarly, the terms "upwardly", "downwardly", "vertical", "horizontal" and the like are used herein for the purpose of explanation only unless specifically indicated otherwise.

It will be understood that, although the terms "first", "second", etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a "first" element, component, region, layer or section discussed below could also be termed a "second" element, component, region, layer or section without departing from the teachings of the present invention. The sequence of operations (or steps) is not limited to the order presented in the claims or figures unless specifically indicated otherwise.

The terms "data storage disk" and "disk" are intended to be interchangeable herein.

Figure 1:
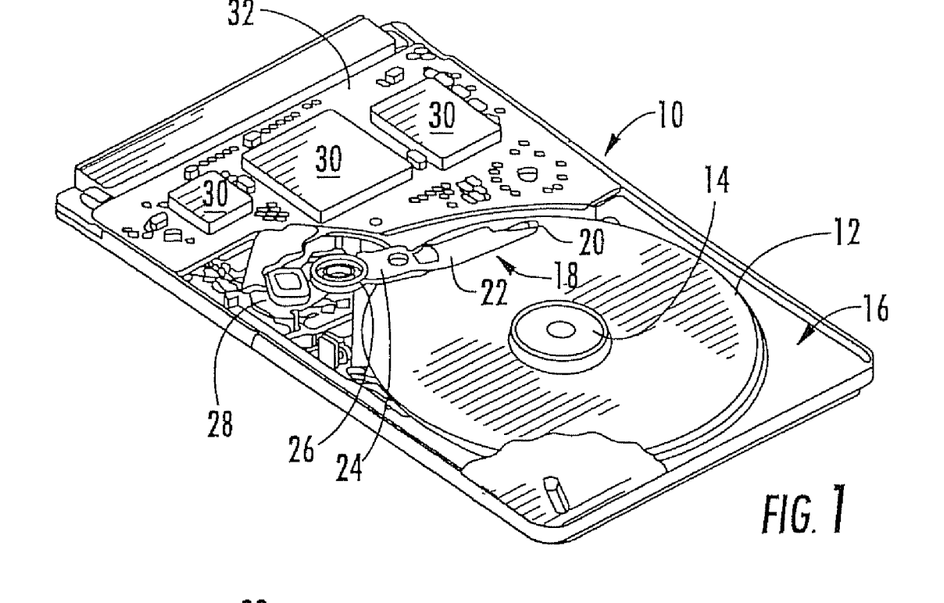
FIG. 1 is a perspective view of a disk drive that is configured in accordance with some embodiments of the present invention.

A simplified diagrammatic representation of an exemplary disk drive, generally designated as 10, is illustrated in FIG. 1. The disk drive 10 includes a disk stack 12 (illustrated as a single disk in FIG. 1) that is rotated by a spindle motor 14. The spindle motor 14 is mounted to a base plate 16. An actuator arm assembly 18 is also mounted to the base plate 16. The disk drive 10 is configured to store and retrieve data responsive to write commands and read commands from a host device. A host device can include, but is not limited to, a desktop computer, a laptop computer, a personal digital assistant (PDA), a digital video recorder/player, a digital music recorder/player, and/or another electronic device that can be communicatively coupled to store and retrieve data in the disk drive 10.

The actuator arm assembly 18 includes a plurality of transducers 20 (or heads) mounted to flexure arms 22 which are attached to actuator arms 24 that can rotate about a pivot bearing assembly 26. Each transducer 20 may include, but is not limited to, a magnetoresistive (MR) element, a thin film inductive (TFI) element, and/or a inductive coil element. The actuator arm assembly 18 also includes a voice coil motor (VCM) 28 which moves transducer 20 relative to the disk stack 12. The spindle motor 14 and actuator arm assembly 18 are coupled to a controller and associated electronic circuits 30 mounted to a printed circuit board 32. The controller 30 may include analog and/or digital circuitry, and typically includes a digital signal processor (DSP), a microprocessor-based controller and a random access memory (RAM) device.

Figure 2:
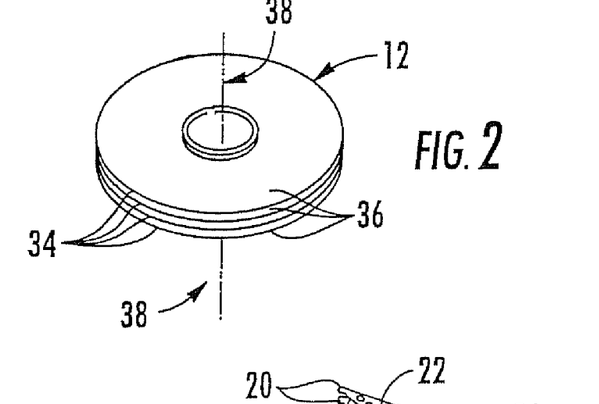
FIG. 2 is a perspective view of a disk stack having a plurality of data storage disks.

Referring now to the illustration of FIG. 2, the disk stack 12 typically includes a plurality of disks 34, each of which may have a pair of disk surfaces 36, 36. The disks 34 are mounted on a cylindrical shaft and are configured to rotate about axis 38. The spindle motor 14, as mentioned above, rotates the disk stack 12. Although the disks 34 are described as magnetic disks for purposes of illustration, they may alternatively be optical disks or any other type of rewritable data storage disk.

Figure 3:
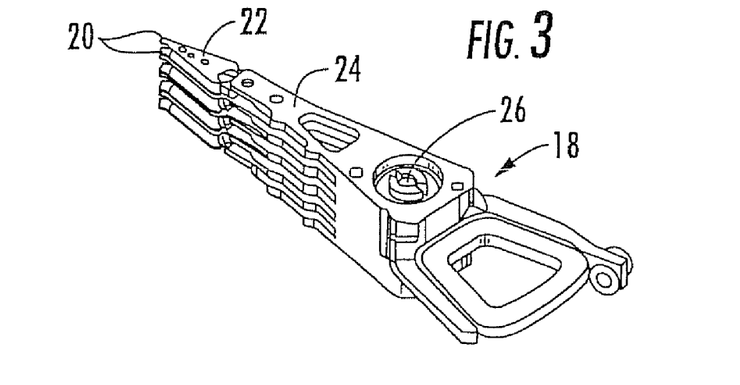
FIG. 3 is a perspective view of a portion of an actuator arm assembly having a plurality of actuator arms.

Referring to the illustration of FIGS. 1 and 3, the plurality of transducers 20 are each adjacent to a different one of the disk surfaces 36. Each transducer 20 is mounted to a corresponding flexure arm 22 which is attached to a corresponding portion of the actuator arm 24 that can rotate about the pivot bearing assembly 26. The VCM 28 operates to move the actuator arm 24, and thus moves the transducers 20 relative to their respective disk surfaces 36.

Figure 4:
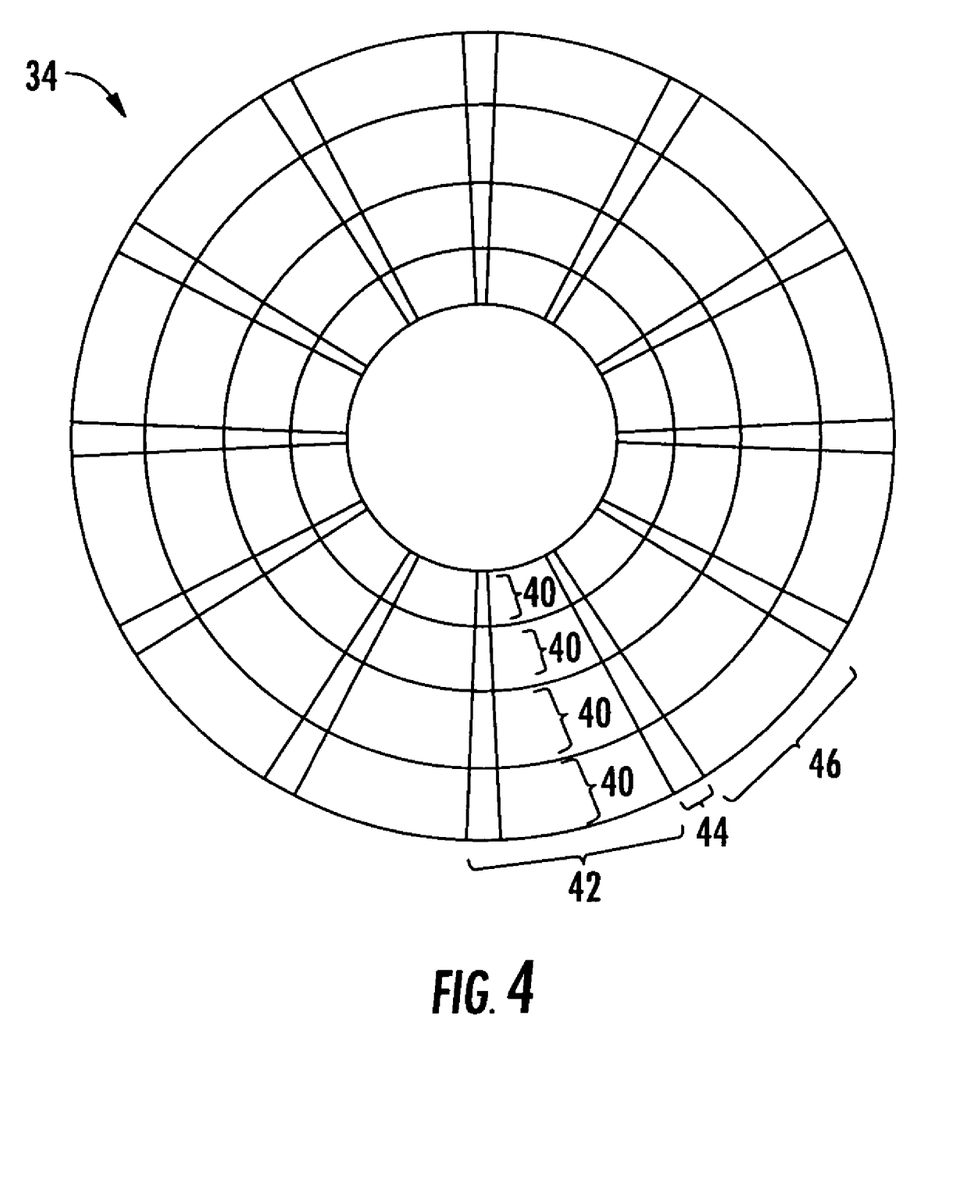
FIG. 4 is a top view of a data storage disk and illustrates tracks and spokes, with each of the spokes being divided into a servo spoke and a data spoke.

FIG. 4 further illustrates one of the disks 34 of an exemplary disk drive. Data is stored on the disk 34 within a number of concentric tracks 40 (or cylinders). Each track is divided into a plurality of radially extending spokes (sectors) 42 on the disk 34. Each spoke 42 is further divided into a servo spoke (sector) 44 and a data spoke (sector) 46. The servo spokes 44 of the disk 34 are used to, among other things, accurately position the transducer 20 so that data can be properly written onto and read from the disk 34. The servo spokes 44 can provide transducer location information such as a track identification field and data block address, for identifying the track and data block. The data spokes 46 are where non-servo related data (i.e., data from a host device) is stored and retrieved. Such data, upon proper conditions, may be overwritten. A host device can write data to and read data from the disk drive 10 by communicating respective write commands and read commands to the controller 30 that identify the associated block addresses of the disk 34 on which data is to be transferred.

Figure 5A:
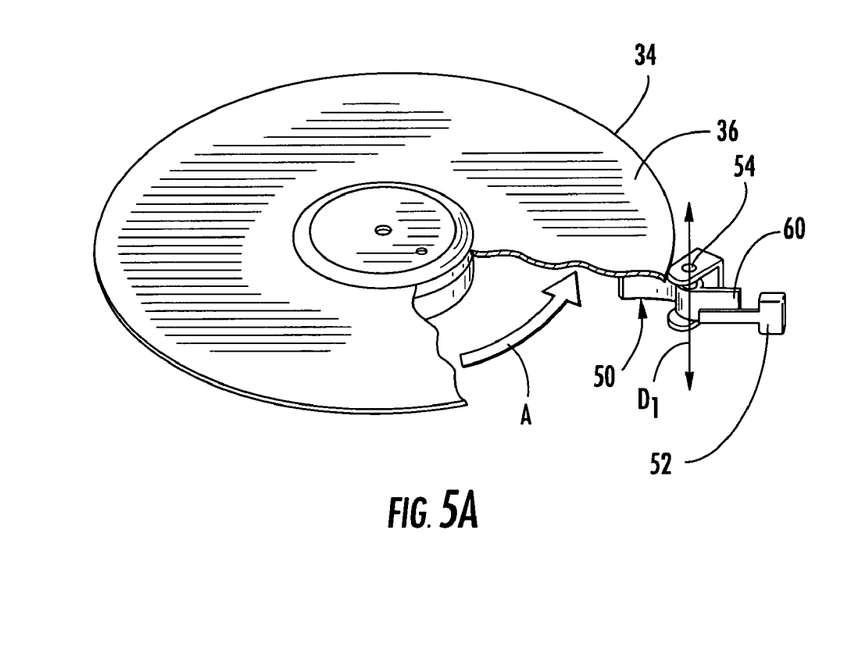
FIG. 5A is a perspective view of a data storage disk and vane for detecting altitude, according to embodiments of the present invention, wherein the surface of the vane is oriented substantially orthogonal to a plane of the disk such that airflow impinges the vane surface.
Figure 5B:
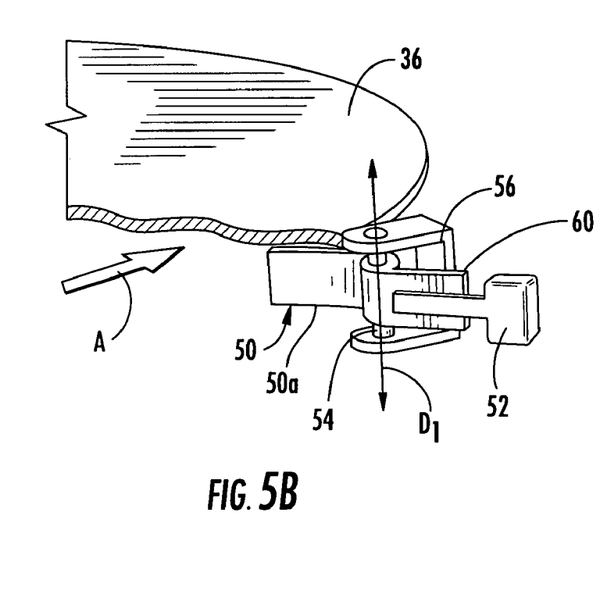
FIG. 5B is an enlarged partial view of FIG. 5A illustrating the orientation of the vane of FIG. 5A relative to the disk and indicating the direction of air flow.

Referring to FIGS. 5A-5B, a disk drive 10, according to embodiments of the present invention, includes a rotatable data storage disk 34 that generates airflow during rotation and a vane 50 that is positioned adjacent to the disk 34. The illustrated vane 50 has a surface 50a that is oriented substantially orthogonal to a plane of the disk 34 and to the direction of airflow (indicated by arrow A). The vane 50 is configured to be impinged by the generated airflow.

The force of airflow impinging the vane 50 is directly proportional to the mass density of the air. Since air density decreases with an increase in altitude, by measuring the force on vane 50, the altitude of a disk drive can be detected. Also, air density is inversely proportional to absolute temperature and directly proportional to air pressure. Because disk drives typically have temperature sensors incorporated into their architecture, the effect of temperature on air density can be constantly nullified. What remains is the relationship between air density and air pressure, which is, equivalently, a relationship between air density and altitude. Thus, if a sensor is used to assess the force (drag) condition on the vane 50, the detected force on the vane will be sensitive to altitude. At lower altitudes (e.g., sea level) the acting force on the vane 50 will be higher than at elevated altitudes (e.g., 10,000 feet)

In the illustrated embodiment, a sensor 52 is operably coupled to the vane 50 and measures force on the vane 50 caused by impingement of the airflow on the vane surface 50a. The sensor 52 provides an output signal that is indicative of the measured airflow force on the vane. A controller 30 (FIG. 1) is configured to determine disk drive altitude based on the output signal and a known relationship between measured airflow force on the vane and disk drive altitude.

The sensor 52 may any of various types of known sensors, including force sensors. Force sensors are well understood by those skilled in the art, and need not be described further herein. According to other embodiments of the present invention, the sensor 52 may be a strain gauge that measures an amount of deformation of the vane 50 due to force applied by the airflow. Strain gauges are well understood by those skilled in the art, and need not be described further herein. The use of strain gauges should not be considered limiting in that alternate forms of force transducing devices are known to those skilled in the art.

According to embodiments of the present invention, the sensor 52 may be configured to provide a continuous signal in response to commensurate altitude-dependent changes in the force applied to the vane 50. Alternatively, the sensor 52 may be configured to provide a signal when the disk drive exceeds one or more threshold altitudes. For example, the sensor 52 may provide a signal when airflow force on the vane indicates the disk drive has exceeded discrete altitudes (e.g., 5,000 feet, 7,500 feet, 10,000 feet, etc.). As would be understood by those skilled in the art, sensor logic (e.g., electronics separate from the actual sensor) or an on-board software/algorithm that detects when an altitude trip point has been achieved, may also be used to generate a signal.

In the illustrated embodiment, the vane 50 is pivotally secured via a pin 54 and bracket 56 adjacent the disk 34 and is configured to pivot about axis $D_1$. The illustrated vane 50 includes an aperture that is configured to receive the pin 54 therethrough. The pin 54 is secured to the bracket as would be understood by those skilled in the at. The illustrated vane 50 also includes a tail portion 60 that is configured to make contact with sensor 52. The impingement of the airflow on the vane surface 50a causes the vane tail portion 60 to impart a force upon the sensor 52 due to rotation of the vane 50 about axis $D_1$.

According to embodiments of the present invention, a biasing element (not illustrated), such as a spring, may be incorporated with the pin 54 to impart a force on the vane 50 that opposes a force caused by airflow. Although not required, the biasing element may be utilized to return the vane to an initial position in the absence of airflow. Various types of biasing elements may be utilized without limitation.

Figure 6A:
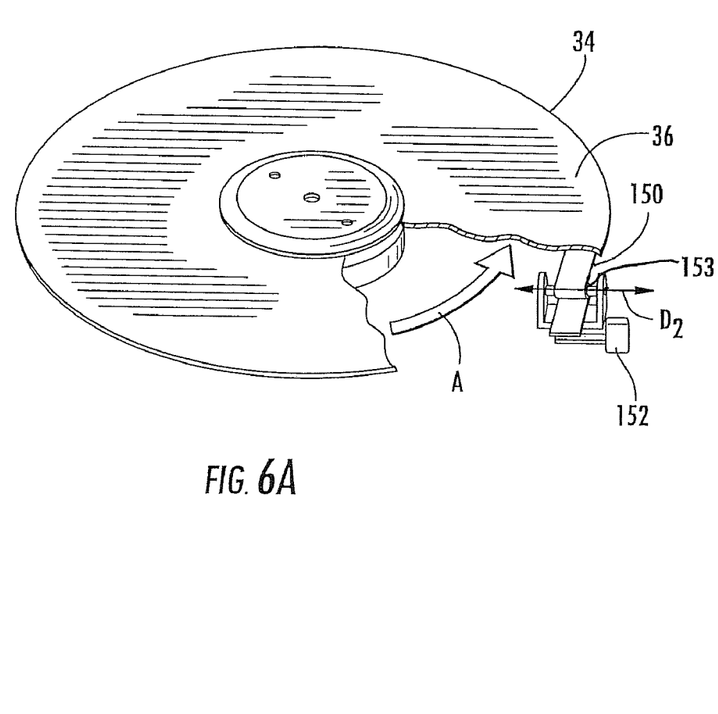
FIG. 6A is a perspective view of a data storage disk and vane for detecting altitude, according to embodiments of the present invention, wherein the surface of the vane is oriented substantially parallel with the plane of the disk such that airflow over the vane surface creates a lift force on the vane.
Figure 6B:
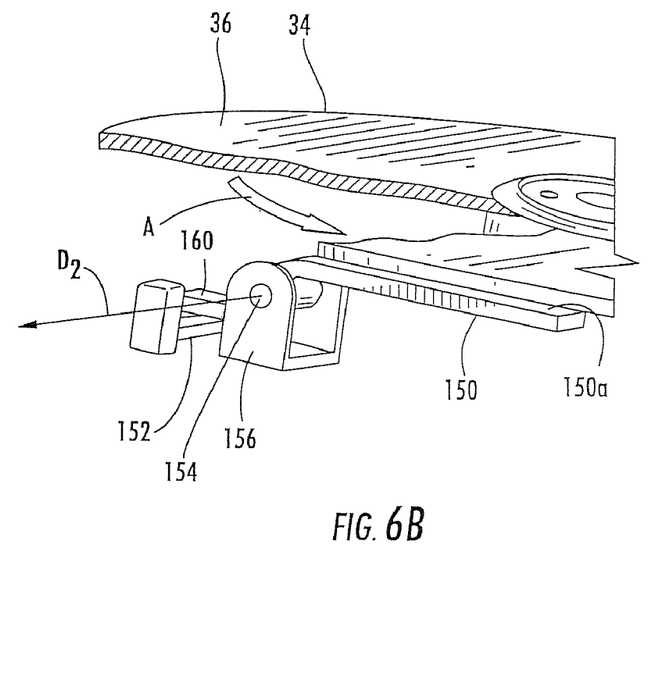
FIG. 6B is an enlarged partial view of FIG. 6A illustrating the orientation of the vane of FIG. 6A relative to the disk and indicating the direction of air flow.

Referring to FIGS. 6A-6B, a disk drive 10 according to embodiments of the present invention includes a rotatable data storage disk 34 that generates airflow during rotation, and a vane 150 that is positioned adjacent to the disk 34. The illustrated vane 150 has a surface 150a that is oriented substantially parallel with the plane of the disk 34 and to the direction of airflow (indicated by arrow A). In the illustrated embodiment, the vane 150 is positioned adjacent the disk surface 36. Airflow over the vane surface 150a creates a Bernoulli effect that causes a lift force on the vane 150. The amount of lift force is proportional to the mass density of the air. As described above, since air density decreases with an increase in altitude, by measuring the amount of lift force caused by airflow generated by rotation of disk 34, the altitude of a disk drive 10 can be detected.

In the illustrated embodiment, a sensor 152 is operably coupled to the vane 150 and measures lift force caused by the Bernoulli effect due to airflow over the vane surface 150a. The sensor 152 provides an output signal that is indicative of measured lift force. A controller 30 (FIG. 1) is configured to determine disk drive altitude based on the output signal and a known relationship between lift force and disk drive altitude. As described above, the sensor 152 may be any of various types of known sensors, including force sensors, strain gauges, etc.

As described above, the sensor 152 may be configured to provide a continuous signal in response to detection of lift force. Alternatively, the sensor 152 may be configured to provide a signal when the disk drive exceeds one or more threshold altitudes. For example, the sensor 152 may provide a signal when lift force indicates the disk drive has exceeded discrete altitudes (e.g., 5,000 feet, 7,500 feet, 10,000 feet, etc.).

In the illustrated embodiment, the vane 150 is pivotally secured via a pin 154 and bracket 156 adjacent the disk 34 and is configured to pivot about axis $D_2$. The illustrated vane 150 includes an aperture 153 that is configured to receive the pin 154 therethrough. The pin 154 is secured to the bracket 156 as would be understood by those skilled in the art. The illustrated vane 150 also includes a tail portion 160 that is configured to make contact with sensor 152. The flow of air over the vane surface 150a causes a lift force on the vane and causes the vane tail portion 160 to impart a downwardly force upon the sensor 152 due to vane rotation about axis $D_2$.

As described above, a biasing element, such as a spring, may be incorporated with the pin 154 to impart a force on the vane 150 that opposes the lift caused by airflow. Although not required, the biasing element may be utilized to return the vane to an initial position in the absence of airflow.

Figure 7:
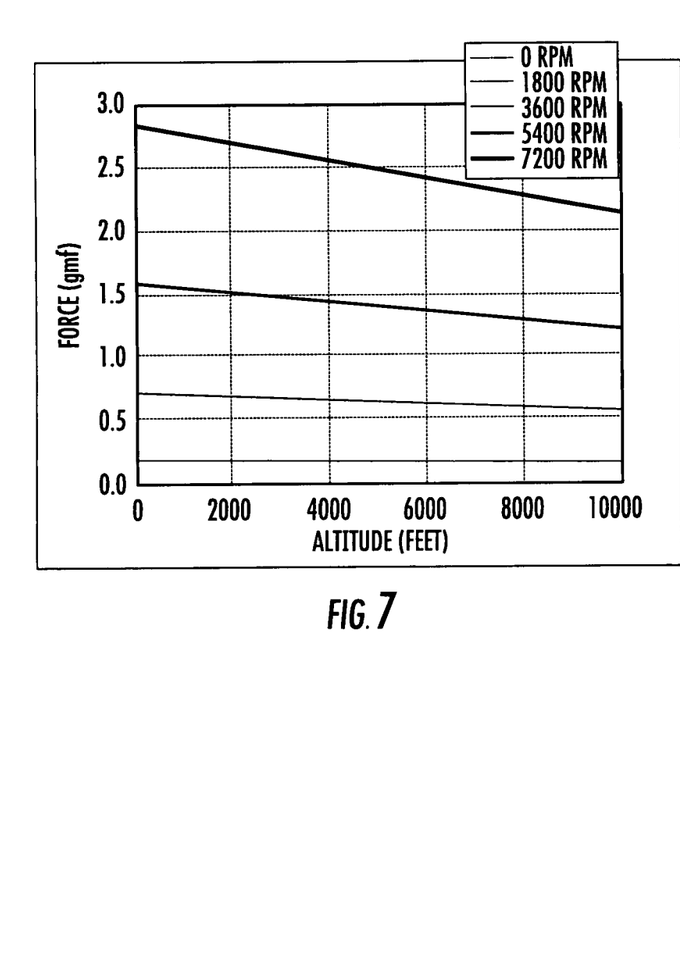
FIGS. 7 and 8 are graphs that illustrate the relationship of airflow force imparted upon a vane and altitude for various disk speeds, according to some embodiments of the present invention.
Figure 8:
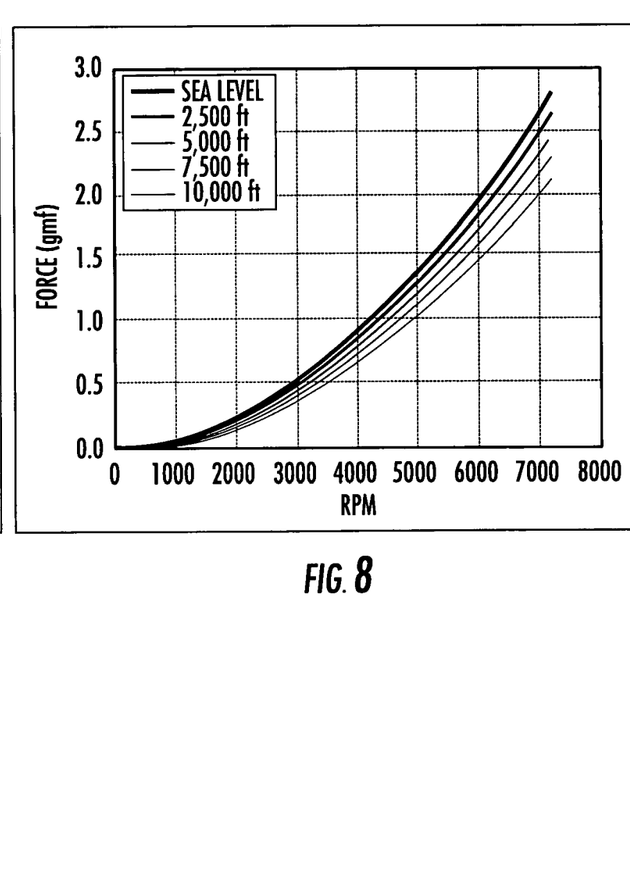

FIGS. 7 and 8 are graphs that illustrate the relationship of airflow force imparted upon a vane surface (e.g., direct impingement force and lift force caused by airflow against and over a vane surface) and attitude for various disk speeds in revolutions per minute (RPM), according to embodiments of the present invention. In FIG. 7, force (i.e., the force of air impinging vane surface 50a of FIGS. 5A-5B or the lift force created by air flowing over vane surface 150a of FIGS. 6A-6B) is plotted along the "Y" axis and the altitude (FEET) is plotted along the "X" axis. FIG. 7 illustrates that dynamic air force is dependent on the altitude of a disk drive 10 and on the rotational speed of a disk 34. As illustrated, an operational speed of 7,200 RPM results in a force change (decrease) of about 0.7 grains force (gmf) when altitude changes from sea level to 10,000 feet.

In FIG. 8, force (i.e., the force of air impinging vane surface 50a of FIGS. 5A-5B or the lift force created by air flowing over vane surface 150a of FIGS. 6A-6B) is plotted along the "Y" axis and the rotation speed (RPM) of a disk is plotted along the "X" axis. FIG. 8 illustrates that as rotational speed of a disk increases, the force versus altitude sensitivity (i.e., the slope) increases.

In FIGS. 7 and 8, the "Y" axis values are dependent on various factors, as would be understood by those skilled in the art. Without limitation, these factors include size of a vane, shape of a vane, orientation of a vane relative to a disk, location of a vane relative to an actuator, airflow modifying structures within a disk drive, etc.

Thus, for the embodiment of FIGS. 5A-5B, as altitude of a disk drive increases, air density decreases and the force of air impinging the vane surface 50a decreases. For the embodiment of FIGS. 6A-6B, as altitude of a disk drive increases, air density decreases and the lift force on the vane 150 caused by the flow of air over vane surface 150a decreases.

The foregoing is illustrative of the present embodiments and is not to be construed as limiting thereof. Although a few exemplary embodiments of this invention have been described, those skilled in the art will readily appreciate that many modifications are possible in the exemplary embodiments without materially departing from the novel teachings and advantages disclosed herein. The embodiments are defined by the following claims, with equivalents of the claims to be included therein.

That which is claimed is:

1. A data storage apparatus, comprising:
   a rotatable disk;
   a vane positioned adjacent to the rotatable disk so as to be within a path of a fluid flow that is generated by a rotation of the rotatable disk;
   a sensor operably coupled to the vane that measures a force with which the fluid flow impingingly engages against the vane and provides an output signal that is indicative of the measured force; and
   a controller that is configured to derive a mass density value of fluid in the fluid flow based on the output signal.

2. The apparatus of claim 1, further comprising a temperature sensor in communication with the controller that measures a temperature of the fluid.

3. The apparatus of claim 1, wherein a surface of the vane that is impinged by the fluid flow is oriented substantially orthogonal to the fluid flow.

4. The apparatus of claim 1, wherein a surface of the vane that is impinged by the fluid flow is oriented substantially parallel with the fluid flow.

5. The apparatus of claim 1, wherein the output signal is continuous.

6. The apparatus of claim 1, wherein the output signal is associated with a predetermined threshold value.

7. The apparatus of claim 1, further comprising a biasing element that imparts a force on the vane that opposes the force with which the fluid flow impingingly engages against the vane.

8. The apparatus of claim 1 wherein the controller is configured to predict an altitude value based on the mass density value.

9. The apparatus of claim 2 wherein the controller is configured to predict an altitude value based on the mass density value and that is compensated by the temperature of the fluid.

10. The apparatus of claim 1 wherein the rotatable disk is a data storage disk, and wherein the controller is configured to determine a clearance between a data transfer member and the data storage disk based on the mass density value.

11. A method for operating a data storage device, comprising:
    rotating a disk to impart a flow to a fluid that is disposed adjacent to the disk;
    positioning a vane in a path of the flow;
    measuring a force value with which the flow impingingly engages against the vane; and
    deriving a mass density value of the fluid based on the force value obtained from the measuring step.

12. The method of claim 11 comprising measuring a temperature value of the fluid, and wherein the deriving step is characterized by compensating the mass density value in relation to the temperature value.

13. The method of claim 11 wherein the positioning step is characterized by operably positioning the vane orthogonally to the fluid flow.

14. The method of claim 11 wherein the positioning step is characterized by operably positioning the vane parallel to the fluid flow.

15. The method of claim 11 wherein the measuring step is characterized by operably sensing a continuous indication of the force value.

16. The method of claim 11 wherein the measuring step is characterized by operably sensing the force value in comparison to a predetermined threshold value.

17. The method of claim 11 wherein the deriving step is characterized by predicting an altitude value based on the mass density value.

18. The method of claim 17 comprising measuring a temperature value of the fluid, and wherein the deriving step is characterized by compensating the altitude value in relation to the temperature value.

19. The method of claim 11 wherein the rotating step is characterized by rotating a data storage disk, and wherein the deriving step is characterized by determining a clearance between a data transfer member and the data storage disk based on the mass density value.

20. A data storage device, comprising:
    a data transfer member operably disposed in a data transfer relationship with a rotating data storage disk; and
    means for predicting an altitude of the data storage device by correlating characteristics of a fluid flow generated by the rotating data storage disk to an associated mass density value of the fluid flow.

* * * * *

UNITED STATES PATENT AND TRADEMARK OFFICE
CERTIFICATE OF CORRECTION

PATENT NO. : 7,660,071 B1
APPLICATION NO. : 11/222553
DATED : February 9, 2010
INVENTOR(S) : Riener et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 534 days.

Signed and Sealed this

Thirtieth Day of November, 2010

David J. Kappos
*Director of the United States Patent and Trademark Office*